(12) United States Patent
Hsiao et al.

(10) Patent No.: US 11,974,083 B2
(45) Date of Patent: Apr. 30, 2024

(54) ELECTRONIC DEVICE INCLUDING SOUND BROADCASTING ELEMENT

(71) Applicant: Innolux Corporation, Miao-Li County (TW)

(72) Inventors: Tzu-Pin Hsiao, Miao-Li County (TW); Wei-Cheng Lee, Miao-Li County (TW); Jiunn-Shyong Lin, Miao-Li County (TW); I-An Yao, Miao-Li County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 18/154,027

(22) Filed: Jan. 12, 2023

(65) Prior Publication Data

US 2023/0179898 A1    Jun. 8, 2023

Related U.S. Application Data

(62) Division of application No. 17/349,928, filed on Jun. 17, 2021, now Pat. No. 11,589,146, which is a (Continued)

(30) Foreign Application Priority Data

Sep. 11, 2019    (CN) .......................... 201910857150.7

(51) Int. Cl.
*H04R 1/02*    (2006.01)
*G06F 3/01*    (2006.01)
*H04R 17/00*    (2006.01)

(52) U.S. Cl.
CPC ............. *H04R 1/028* (2013.01); *G06F 3/016* (2013.01); *H04R 17/00* (2013.01); *H04R 2499/15* (2013.01)

(58) Field of Classification Search
None
See application file for complete search history.

(56) References Cited

U.S. PATENT DOCUMENTS

2011/0205173 A1* 8/2011 Arai ........................ G06F 3/016
                                                          345/173
2013/0307806 A1* 11/2013 Yokoyama .............. G06F 3/016
                                                          345/173

FOREIGN PATENT DOCUMENTS

CN       1813488        8/2006
CN      102169387       8/2011
(Continued)

OTHER PUBLICATIONS

"Office Action of China Counterpart Application", dated Aug. 16, 2022, p. 1-p. 11.
(Continued)

*Primary Examiner* — Mark Fischer
(74) *Attorney, Agent, or Firm* — JCIPRNET

(57) ABSTRACT

An electronic device including a protection layer, a display panel, and a sound broadcasting element is provided. The protection layer has an inner surface and a side surface directly connected to the inner surface. The display panel is disposed on the inner surface of the protection layer and has a back surface and a side surface directly connected to the back surface. The sound broadcasting element is located adjacent to the side surface of the display panel, and the sound broadcasting element includes a piezoelectric component and a connection component.

3 Claims, 8 Drawing Sheets

Related U.S. Application Data division of application No. 16/726,951, filed on Dec. 26, 2019, now Pat. No. 11,070,899.

(60) Provisional application No. 62/794,806, filed on Jan. 21, 2019.

(56) References Cited

FOREIGN PATENT DOCUMENTS

| | | |
|---|---|---|
| CN | 203720555 | 7/2014 |
| CN | 109358752 | 2/2019 |
| JP | WO2002021881 | 12/2004 |

OTHER PUBLICATIONS

"Office Action of China Counterpart Application", dated Jan. 11, 2023, p. 1-p. 9.

* cited by examiner

ELECTRONIC DEVICE INCLUDING SOUND BROADCASTING ELEMENT

CROSS-REFERENCE TO RELATED APPLICATION

This Application is a Divisional Application of and claims the priority benefit of U.S. application Ser. No. 17/349,928, filed on Jun. 17, 2021. The prior U.S. application Ser. No. 17/349,928 is a Divisional Application of and claims the priority benefit of U.S. application Ser. No. 16/726,951, filed on Dec. 26, 2019. The prior U.S. application Ser. No. 16/726,951 claims the priority benefits of U.S. provisional application Ser. No. 62/794,806, filed on Jan. 21, 2019, and China application serial no. 201910857150.7, filed on Sep. 11, 2019. The entirety of each of the above-mentioned patent applications is hereby incorporated by reference herein and made a part of this specification.

BACKGROUND

Technical Field

The disclosure relates to an electronic device, and more particularly to a display device.

Description of Related Art

Electronic products have become indispensable in modern society. With the rapid development of such electronic products, consumers have high expectations for the quality, functions, or prices of these products. However, these electronic products still have not satisfied the needs in all aspects. Some of the electronic products are characterized by communication capabilities or display functions, but the configuration and the design of related elements (such as speakers) are still one of the topics for developers.

SUMMARY

The disclosure provides an electronic device featuring an improved screen-to-body ratio or full-screen display.

According to an embodiment of the disclosure, an electronic device includes a protection layer, a display panel, and a sound broadcasting element. The protection layer has an inner surface and a side surface directly connected to the inner surface. The display panel is disposed on the inner surface of the protection layer and has a back surface and a side surface directly connected to the back surface. The sound broadcasting element is located adjacent to the side surface of the display panel, and the sound broadcasting element includes a piezoelectric component and a connection component.

In order to make the above features and advantages of the disclosure more obvious, the following embodiment is described in detail with reference to the accompanying drawings.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles described herein.

DESCRIPTION OF THE EMBODIMENTS

Figure 1:
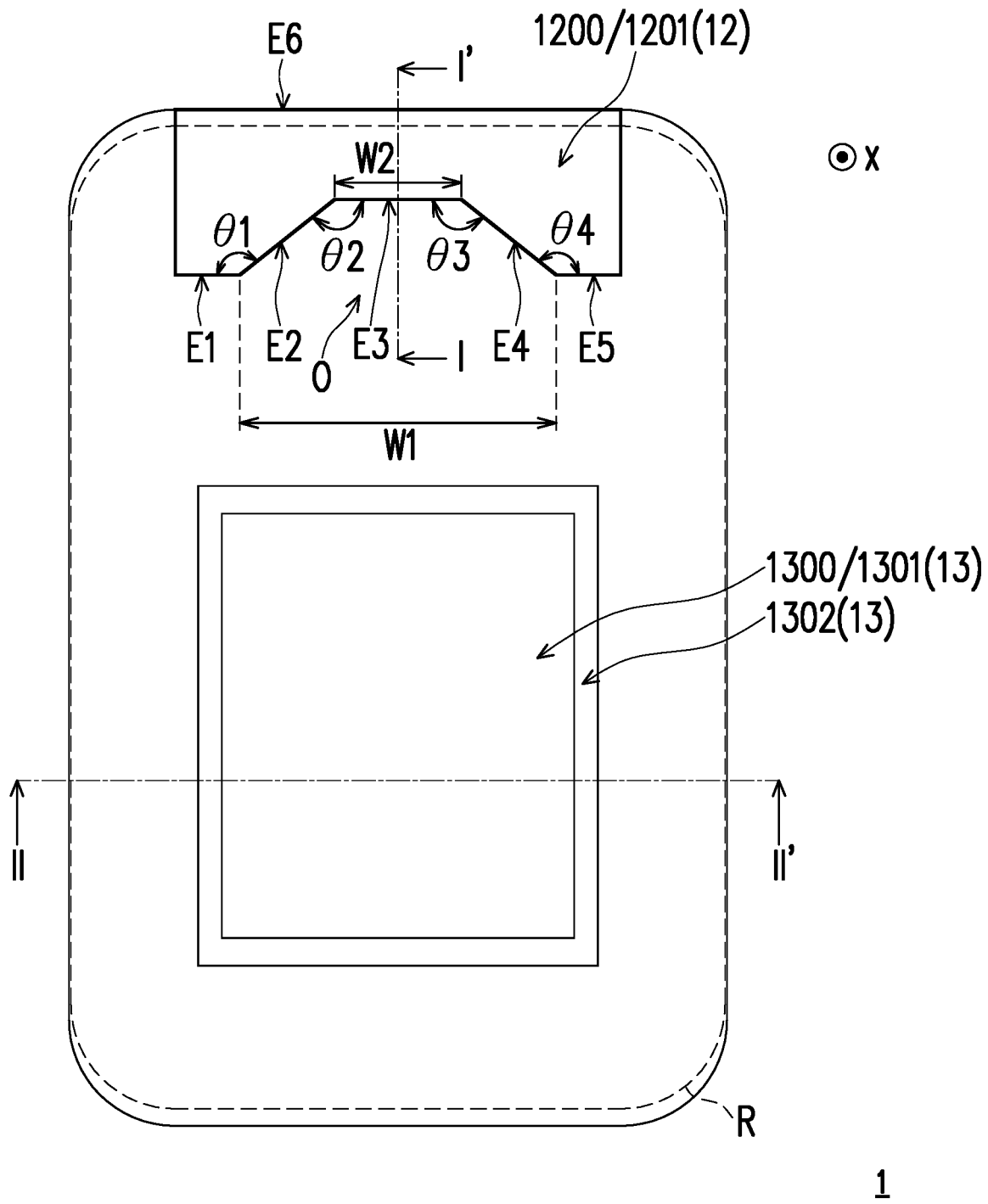
FIG. 1 is a schematic top view of an electronic device according to an embodiment of the disclosure.

The disclosure can be understood with reference to the following exemplary embodiments and the accompanying drawings. For easy understanding and simplicity of drawings, some of the drawings in the disclosure depict only a portion of the electronic device/the display device, and specific components in the drawings are not drawn according to actual scales.

In the drawings, common characteristics of the methods, structures and/or materials used in specific exemplary embodiments are shown. However, the drawings are not limited to the structures or features of the following embodiments and the drawings should not be interpreted to define or limit the scopes or the properties of the descriptions in the exemplary embodiments. For instance, the relative dimension, thickness, and location of each film layer, region, and/or structure may be reduced or enlarged for clarity.

Certain terms are used throughout the description and the claims to refer to particular elements. People skilled in the pertinent art shall appreciate that electronic device manufacturers may use different names to denote the same element. The disclosure does not aim at distinguishing the elements with the same function but different names.

In the description and claims, the words "having," "including," and "comprising" are open-ended and therefore should be interpreted as "including but not limited to". Moreover, "first", "second", etc. mentioned in the specification and the claims are merely used to name the discrete elements or to differentiate different ranges or embodiments and therefore should not be regarded as limiting the upper or lower bound of the number of the components/devices and should not be used to limit the manufacturing sequence of components.

The directional terminologies mentioned in the detailed description, such as "top," "bottom," "front," "back," "left," or "right", etc., are used as a reference to the orientation of the drawings being described. Accordingly, the drawings and descriptions will be regarded as being illustrative in nature but not as being restrictive.

It should be understood that when an element or a film layer is referred to as being disposed "on" another element or another film layer or "connecting/bonding" another element or another film layer, the element or the film layer may be directly located on the other element or film layer or directly connected/bonded to the other element or film layer, or there may be an intervening element or film layer between the two elements (indirect connection/bonding). By contrast, when the element or the film layer is referred to as being "directly on" or "directly connected/bonded" to another element or another film layer, there is no intervening element nor film layer between the two elements. In addition, connecting or bonding two elements to each other may indicate both elements are fixed or at least one of the elements is movable.

The terms "about," "approximately," "substantially," "equal to," "equal," or "identical" used herein are generally meant to fall within a range of 20%, 10%, 5%, 3%, 2%, 1%, or 0.5% of a given value or range.

In the following embodiments, the same or similar elements will be given the same or similar reference numerals, and the description thereof will be omitted. In addition, the features provided in different embodiments may be arbitrarily combined and applied without departing from the spirit of the disclosure, and the simple equivalent changes and modifications made in the descriptions or claims are still within the scope of the disclosure.

According to one or more embodiments of the disclosure, the electronic devices provided herein may include but should not be limited to an antenna device, a display device, a sensing device, a light-emitting device, a tiled device, other suitable devices, or a combination thereof. The electronic device can be a bendable or flexible electronic device. The antenna device may include but is not limited to, for instance, a liquid crystal antenna. The tiled device may include but is not limited to, for instance, an antenna tiled device. It should be understood that the electronic device may include but is not limited to any combination of the foregoing devices.

In the following embodiments, the electronic device will be exemplified by a display device, but the disclosure is not limited thereto. When the electronic device is the display device, the display device can be but is not limited to a bendable display device, a flexible display device, a touch display device, a curvature display device, or a tiled display device. In addition, the display device can be applied to a television (TV), a notebook computer, a tablet PC, a mobile phone, a monitor, an automobile display, or any other electronic device that requires the display function.

Figure 2:
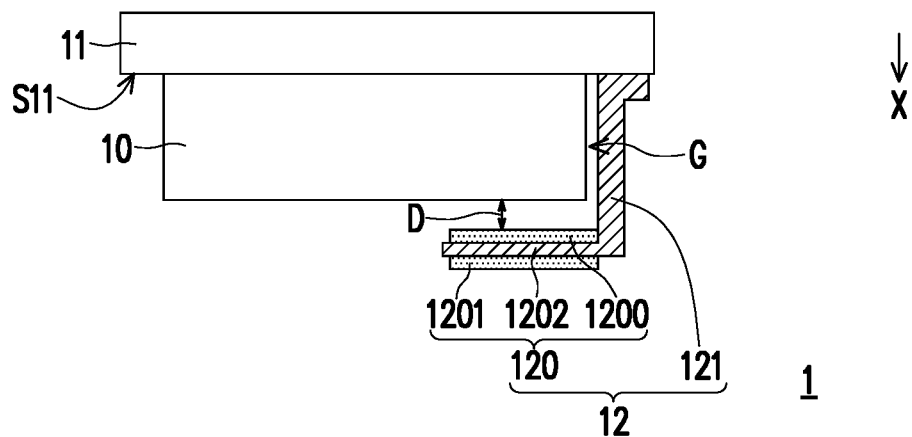
FIG. 2 is a schematic cross-sectional view taken along a sectional line I-I' in FIG. 1.

FIG. 1 is a schematic top view of an electronic device according to an embodiment of the disclosure. FIG. 2 is a schematic cross-sectional view taken along a sectional line I-I' in FIG. 1. With reference to FIG. 1 and FIG. 2, an electronic device 1 comprises a display panel 10, a protection layer 11, and a sound broadcasting element 12. In some embodiments, the display panel 10 can be replaced by other electronic components, circuit boards, substrates having electronic devices, or a combination of the above, which should however not be construed as a limitation in the disclosure.

The display panel 10 can provide a display image. For instance, the display panel 10 can include but should not be limited to liquid crystal (LC), an organic light-emitting diode (OLED), quantum dots (QD), a fluorescence material, a phosphor material, a light-emitting diode (LED), e.g., a micro light-emitting diode or mini light-emitting diode, a quantum dot light-emitting diode (QDLED, QLED), other materials, or a combination of the above.

In an embodiment, the electronic device 1 may further comprise a backlight module (not shown), and the display panel 10 may be disposed between the protection layer and the backlight module. The backlight module may include a light source. The light source may include the LED, the OLED, the mini LED, the micro LED, or the quantum dot LED (QLED, QDLED), however the types of the light source as mentioned above are not be construed as a limitation in the disclosure.

The protection layer 11 can be disposed on the display panel 10 and may protect the display panel 10. For instance, a material of the protection layer 11 may include glass, a polymer, an insulation material, other suitable materials, or a combination of at least two of the above. In an embodiment, the protection layer 11 and the display panel 10 may have the same or different thicknesses.

The sound broadcasting element 12 and the display panel 10 may be positioned below the protection layer 11, and the sound broadcasting element 12 may contact the protection layer 11. As shown in FIG. 1, the display panel 10 and the sound broadcasting element 12 may contact an inner surface S11 of the protection layer 11. In addition, at least one portion of the sound broadcasting element 12 may be located on a side of the display panel 10, and an air gap G may exist between the sound broadcasting element 12 and the display panel 10. In other words, the sound broadcasting element 12 may be spaced from the display panel 10, just like there exists a gap between the sound broadcasting element 12 and the display panel 10. The relative configuration relationship between the display panel 10 and the sound broadcasting element 12 may be changed as needed, the relative configuration relationship should not be construed as a limitation in the disclosure.

In an embodiment, as shown in FIG. 2, the sound broadcasting element 12 may include a piezoelectric component 120 and a connection component 121. The connection component 121 may be connected between the piezoelectric component 120 and the protection layer 11. In an embodiment, as shown in FIG. 2, the connection component 121 may be located on a side of the display panel 10, and the air gap G may exist between the connection component 121 and the side of the display panel 10. The display panel 10 may be located between the piezoelectric component 120 and the protection layer 11. Besides, the piezoelectric component 120 and the display panel 10 may be partially overlapped or completely overlapped. In an embodiment, as shown in FIG. 2, the piezoelectric component 120 and the display panel 10 may be spaced from each other by a distance D. In other words, the piezoelectric component 120 may not contact with the display panel 10. The distance D can be the maximum distance between the piezoelectric component 120 and the display panel 10 in a thickness direction X of the electronic device 1. The distance D is, for instance, in the range of 0.1 millimeter (mm) to 5 centimeters (cm), i.e., 0.1 mm≤distance D≤5 cm, however the distance D is not construed as a limitation in the disclosure.

In an embodiment, as shown in FIG. 2, the piezoelectric component 120 may include a piezoelectric portion (such as a piezoelectric portion 1200 and a piezoelectric portion 1201) and a conductive portion 1202. The piezoelectric portion 1200, the piezoelectric portion 1201, and the conductive portion 1202 are overlapped, and the piezoelectric portion 1200 and the piezoelectric portion 1201 may be located on opposite sides of the conductive portion 1202, respectively. In another embodiment, the piezoelectric portion 1200 and the piezoelyectric portion 1201 may also be integrated, however it should not be construed as a limitation in the disclosure. A material of the piezoelectric portion 1200 and/or the piezoelectric portion 1201 may include Pb(ZrTi)O$_3$ (PZT), polyvinylidene difluoride (PVDF), other suitable piezoelectric materials, or a combination of at least two of the above. A material of the conductive portion 1202 may include silver, copper, gold, aluminum, nickel, lead, tin, iron, an alloy of the above metals, and/or a combination of at least two of the above materials. In some embodiments, the material of the conductive portion 1202 may also be replaced by other suitable rigid materials. A material of connection component 121 may include a conductive material or another suitable material. The conductive material may be selected from the material of the aforesaid material of the conductive portion 1202, which should however not be construed as a limitation in the disclosure. In an embodiment, the connection component 121 and the conductive portion 1202 may be made of the same material, which should however not be construed as a limitation in the disclosure. In an embodiment, the conductive portion 1202 may be formed by a portion of the connection component 121 overlapping the display panel 10, which should however not be construed as a limitation in the disclosure. In an embodiment, the material of the connection component 121 can also be replaced by a buffer material. It should be mentioned that the number of elements in the piezoelectric component 120 and the relative configuration relationship between the elements may be changed as need and should not be limited to what is shown in FIG. 2. For instance, the number of the piezoelectric portions in the piezoelectric component 120 may be one or more than two, which should however not be construed as a limitation in the disclosure.

The sound broadcasting element 12 may be connected to the protection layer 11 through the connection component 121. The conductive portion 1202 in the piezoelectric component 120 supplies electrical power to the piezoelectric portion (e.g., the piezoelectric portion 1200 and the piezoelectric portion 1201), and the piezoelectric portion may convert the electrical power into mechanical power (vibration waves) and conducts the vibration waves to the protection layer 11. In an embodiment, the vibration frequency of the piezoelectric portion maybe in a range from 20 Hz to 20 kHz (20 Hz≤the vibration frequency≤20 kHz), such as 250 Hz, 400 Hz, 500 Hz, 800 Hz, 1000 Hz, or 2000 Hz, which should however not be construed as a limitation in the disclosure. In other embodiments, the vibration frequency may also be in the ultrasonic band.

With the setting of the sound broadcasting element 12, the electronic device 1 may not need to arrange any sound hole in a display region R, so as to increase the screen-to-body ratio or achieve full-screen display. In an embodiment, the sound broadcasting element 12 may also provide a tactile feedback function (e.g., the sound broadcasting element 12 may vibrate while the electronic device 1 is being pressed long), which should however not be construed as a limitation in the disclosure.

The way to set the piezoelectric portion (such as the piezoelectric portion 1200 or the piezoelectric portion 1201) in the sound broadcasting element 12, the top-view shape of the piezoelectric portion, and the area of the piezoelectric portion can be designed according to requirements (such as tone, the sense of vibration, or the like). The top-view shape refers to the shape observed in the thickness direction X of the electronic device 1.

For instance, as shown in FIG. 1, the piezoelectric portion (such as the piezoelectric portion 1200 or the piezoelectric portion 1201) may have at least one opening O. A width W1 of the opening O may be greater than a width W2 of the opening O, which should however not be construed as a limitation in the disclosure. The width W1 may be the maximum width of the opening O spaced from the connection component 121, which should however not be construed as a limitation in the disclosure. The width W2 may be the minimum width of the opening O adjacent to the connection component 121, which should however not be construed as a limitation in the disclosure. The piezoelectric portion is adjacent to a plurality of included angles (e.g., an included angle θ1, an included angle θ2, an included angle θ3, and an included angle θ4) between a plurality of sides of the at least one opening O (e.g., a first side E1, a second side E2, a third side E3, a fourth side E4, and a fifth side E5), and the included angles may be in a range of 95-135 degrees, respectively, for instance, 100 degrees, 105 degrees, 110 degrees, or 120 degrees, i.e., 95 degrees≤θ1≤135°, 95°≤θ2≤135°, 95°≤θ3≤135° and 95°23 θ4≤135°. The included angles θ1-θ4 may be the same, at least partially identical (at least partially different), or different. In addition, any included angle can be rounded rather than sharp, however it should not be construed as a limitation in the disclosure.

By properly designing the position, the dimension, and/or the shape of the opening, the piezoelectric portion may effectively transmit the vibration waves to the protection layer 11 when the piezoelectric portion vibrates at low frequencies (e.g., 250 Hz to 650 Hz).

In FIG. 1, the opening O of the piezoelectric portion (such as the piezoelectric portion 1200 or the piezoelectric portion 1201) may face a central area of the electronic device 1. The stability of the piezoelectric component 120 may be increased by connecting the connection portion 121 to a wider part of the piezoelectric portion (such as the sixth edge E6 of the piezoelectric portion), but the configuration of the piezoelectric portion (such as the piezoelectric portion 1200 or the piezoelectric portion 1201) is not thereto. In an embodiment, the piezoelectric portion may be turned 180 degrees (or may be set at any angle), so that the opening O faces the outside of the electronic device 1. In an embodiment, the piezoelectric portion may have a plurality of openings O. In another embodiment, the piezoelectric portion may have no opening O. In an embodiment, the top-view shape of the piezoelectric portion may be a rectangle, a triangle, a circle, a polygon, any other suitable shape, or a combination of the above, which should however not be construed as a limitation in the disclosure.

In response to different demands, electronic device 1 may further include other elements and/or film layers. For instance, the electronic device 1 may further include a touch layer (not shown). The touch layer may include an out-cell touch structure, an in-cell touch (e.g., an on-cell touch or an in-cell touch) structure, or a hybrid touch structure, which should however not be construed as a limitation in the disclosure. The touch structure may include a two-dimensional (2D) touch structure or a three-dimensional (3D) touch structure.

Figure 3:
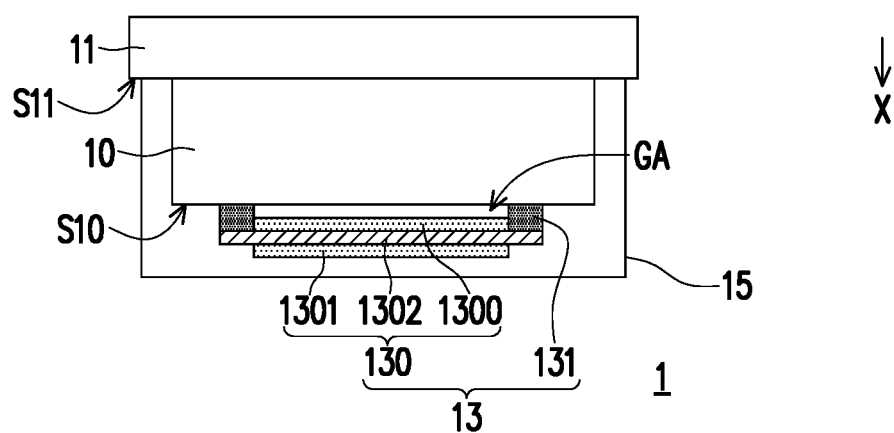
FIG. 3 is a schematic cross-sectional view taken along a sectional line II-II' in FIG. 1.

In this embodiment, in addition to the sound broadcasting element 12, the electronic device 1 may further include a sound broadcasting element 13. For instance, the sound broadcasting element 12 may be used, for example, as an earpiece, and the sound broadcasting element 13 may be used as a speaker, for instance, which should however not be construed as limitations in the disclosure. FIG. 3 is a schematic cross-sectional view taken along a sectional line II-II' in FIG. 1. With reference to FIG. 3, in an embodiment, the sound broadcasting element 13 may be disposed on a back surface S10 of the display panel 10, and the sound broadcasting element 13 may include a piezoelectric component 130 and a connection component 131. The connection component 131 may be connected between the piezoelectric component 130 and the display panel 10. The connection component 131 may contact the back surface S10 of the display panel 10, and a cavity GA may exist between the piezoelectric component 130 and the display panel 10. In other words, the piezoelectric component 130 may not contact with the display panel 10.

In an embodiment, as shown in FIG. 3, the piezoelectric component 130 may include a piezoelectric portion (such as a piezoelectric portion 1300 and a piezoelectric portion 1301) and a conductive portion 1302. The piezoelectric portion 1300, the piezoelectric portion 1301, and the conductive portion 1302 may be overlapped. In the disclosure, the state of "overlapping" includes "complete overlapping" and "partial overlapping" unless otherwise stated. The piezoelectric portions 1300 and 1301 may, for instance, be disposed on two opposite sides of the conductive portion 1302, respectively. Materials of the piezoelectric portion and the conductive portion may be referred to as those described above and will not be repeated hereinafter. In addition, the number of the piezoelectric portions in the piezoelectric component 130 and the relative configuration relationship between the piezoelectric portion and the conductive portion 1302 may be changed as need and should not be limited to what is shown in FIG. 3. For instance, the number of the piezoelectric portions in the piezoelectric component 130 may be one or greater than two. In an embodiment, a material of the connection component 131 may include a buffer material. The buffer material may include a porous material, a soft material, another suitable material, or a combination of at least two of the above materials, however it should not be construed as a limitation in the disclosure. For instance, the buffer material may include silicone, latex, Styrofoam, another suitable materials, or a combination thereof.

The sound broadcasting element 13 may be connected to the display panel 10 through the connection component 131. For instance, the connection component 131 may contact the backlight module in the electronic device 1, however it should not be construed as a limitation in the disclosure. The conductive portion 1302 may supply electrical power to the piezoelectric portion (such as the piezoelectric portion 1300 and the piezoelectric portion 1301), and the piezoelectric portion may convert the electrical power into the mechanical power (vibration waves) and conduct the vibration waves to the display panel 10 and/or the protection layer 11.

In FIG. 1, the top-view shape of the piezoelectric portion (such as the piezoelectric portion 1300 or the piezoelectric portion 1301) is a rectangle, which should however not be construed as a limitation in the disclosure. In an embodiment, the top-view shape of the piezoelectric portion may include a rectangle, a triangle, a circle, a polygon, another suitable shape, or a combination of the above, which should however not be construed as a limitation in the disclosure. In some embodiments, the electronic device 1 may further include a casing 15 (as shown in FIG. 3), and there may be a relatively large cavity between the casing 15 and the protection layer 11 (or between the casing 15 and the display panel 10), which is conducive to effective transmission of the vibration waves to the display panel 10 and the protection layer 11 when the piezoelectric portion vibrates at low frequencies (such as 250 Hz to 650 Hz). In an embodiment, the electronic device 1 may not include the sound broadcasting element 13.

Figure 4A:
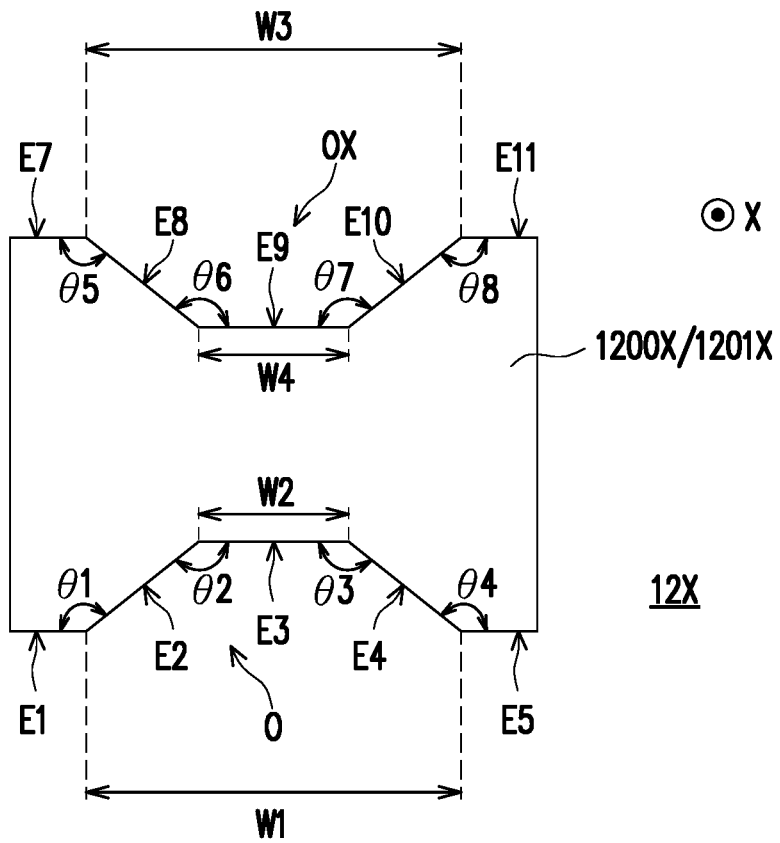
FIG. 4A to FIG. 4C are schematic top views of various sound broadcasting elements applicable to the electronic device provided herein.
Figure 4B:
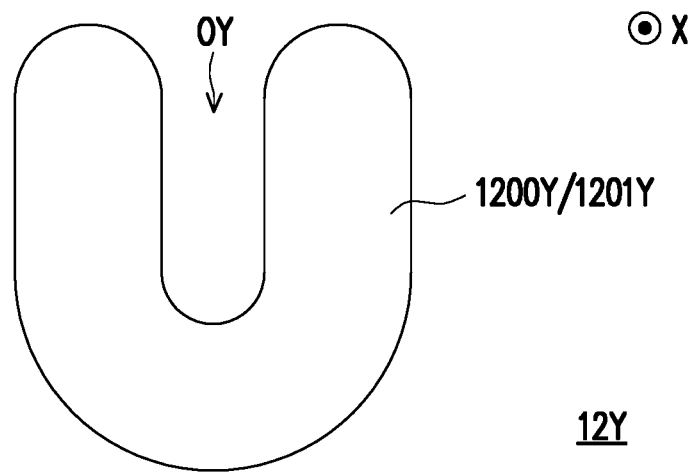
Figure 4C:
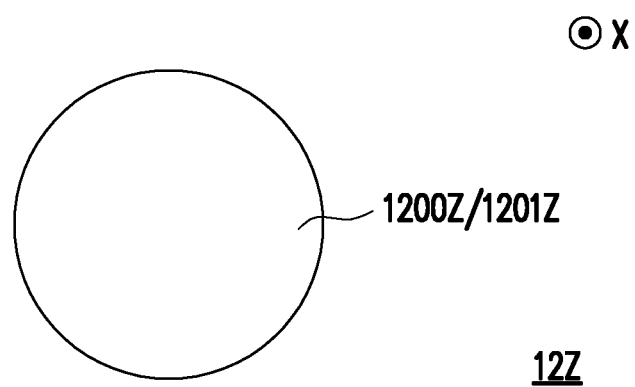

FIG. 4A to FIG. 4C are schematic top views of various sound broadcasting elements applicable to the electronic device (such as the electronic device 1 of FIG. 1) provided herein. For instance, the sound broadcasting element 12 and/or the sound broadcasting element 13 in FIG. 1 may be replaced by any one or more of the sound broadcasting elements 12X-12Z shown in FIG. 4A-4C, which should however not be construed as a limitation in the disclosure.

In FIG. 4A, the main difference between the sound broadcasting element 12X and the sound broadcasting element 12 in FIG. 1 is that the piezoelectric portion of the sound broadcasting element 12X (such as a piezoelectric portion 1200X or a piezoelectric portion 1201X) has another opening OX in addition to the opening O. The width W1 of the opening O may be greater than the width W2 of the opening O, which should however not be construed as a limitation in the disclosure. A width W3 of the opening OX may be greater than a width W4 of the opening OX, which should however not be construed as a limitation in the disclosure. The width W1 of the opening O and the width W3 of the opening OX may be the maximum widths of the opening O and the opening OX adjacent to an edge of the piezoelectric portion, respectively, which should however not be construed as a limitation in the disclosure. The width W2 of the opening O and the width W4 of the opening OX may be the minimum widths of the opening O and the opening OX adjacent to the central region of the piezoelectric portion, respectively, which should however not be construed as a limitation in the disclosure. The width W1 and the width W3 may be the same or different, and the width W2 and the width W4 may be the same or different. The piezoelectric portion is adjacent to a plurality of included angles (e.g., the included angles θ1-θ8) between a plurality of sides of the openings O and OX (e.g., the first side E1, the second side E2, the third side E3, the fourth side E4, the fifth side E5, a seventh side E7, an eighth side E8, a ninth side E9, a tenth side E10, and an eleventh side E11), and the included angles may be in a range of 95-135 degrees, respectively, for instance, 105 degrees, 110 degrees, or 120 degrees, i.e., 95 degrees≤θ1 (or θ2, θ3, θ4, θ5, θ6, θ7, θ8)≤135°. The included angles θ1-θ8 may be all the same, at least partially identical (at least partially different), or different. In addition, any included angle may be rounded rather than sharp, which should however not be construed as a limitation in the disclosure.

In FIG. 4B, the main difference between the sound broadcasting element 12Y and the sound broadcasting element 12 in FIG. 1 is that the top-view shape of a piezoelectric portion of the sound broadcasting element 12Y (such as a piezoelectric portion 1200Y or a piezoelectric portion 1201Y) is a neck pillow shape, and the piezoelectric portion has an opening OY shaped as a letter U. However, the detailed structure of the sound broadcasting element 12Y and the shape of the opening OY may be changed as needed, which should not be construed as a limitation in the disclosure.

In FIG. 4C, the main difference between the sound broadcasting element 12Z and the sound broadcasting element 12 in FIG. 1 is that the top-view shape of the piezoelectric portion of the sound broadcasting element 12Z (such as a piezoelectric portion 1200Z or a piezoelectric portion 1201Z) is substantially circular, and the piezoelectric portion may not have any opening. In other embodiments, the top-view shape of the piezoelectric portion of the sound broadcasting element 12Z may include at least one arc.

In other embodiments, by appropriately designing the dimension, the shape, and/or the position of the opening of the piezoelectric portion, the piezoelectric portion may effectively transmit the vibration waves to the protection layer when the piezoelectric portion vibrates at different frequencies. Therefore, FIG. 1 and FIG. 4A to FIG. 4C are merely examples showing the implementations of the piezoelectric portion, which should however not be construed as limitations in the disclosure.

FIG. 5 to FIG. 12 are schematic cross-sectional views of electronic devices 1A-1H according to several embodiments of the disclosure. Please refer to FIG. 5. The main differences between an electronic device 1A and the electronic device 1 in FIG. 2 are described as follows. In the electronic device 1A, a sound broadcasting element 12A may contact a side surface S11S of the protection layer 11 and a side surface S10S of the display panel 10. Further, the sound broadcasting element 12A may include the afore-mentioned piezoelectric component 120 and a connection component 121A. The connection component 121A may contact the side surface S11S of the protection layer 11 and/or the side surface S10S of the display panel 10. That is, the connection component 121A may be fixed by the side surface S11S of the protection layer 11 and the side surface S10S of the display panel 10. In some embodiments, the connection component 121A may contact the side surface S10S of the display panel 10 but the connection component 121A may not contact the side surface S11S of the protection layer 11; for instance, the connection component 121A may be disposed on the inner surface S11, which should however not be construed as a limitation in the disclosure.

Figure 5:
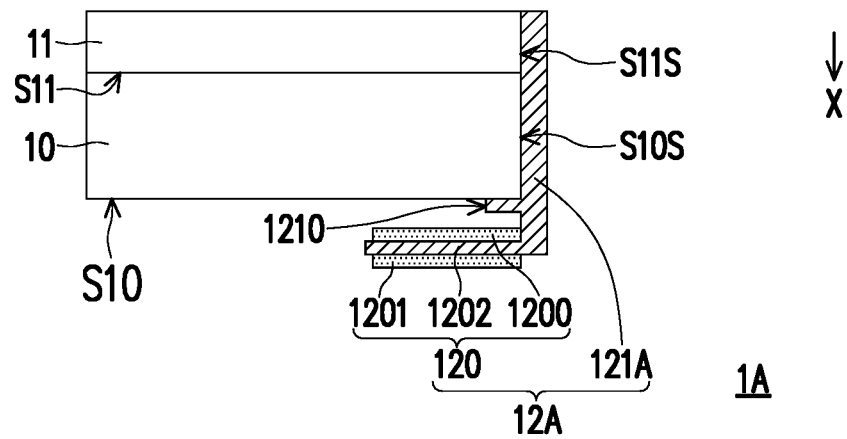
FIG. 5 to FIG. 12 are schematic cross-sectional views of electronic devices according to several embodiments of the disclosure.

Through the design of the sound broadcasting element 12A in contact with the side surface S11S of the protection layer 11 and the side surface S10S of the display panel 10, the space for setting the sound broadcasting element 12A may be reduced and may be conducive to achieving a narrow border design. In an embodiment, as shown in FIG. 5, the connection component 121A may also include a contact member 1210 contacting the back surface S10 of the display panel 10 to increase the contact area between the connection component 121A and the display panel 10. In an embodiment, the electronic device 1A may not include the protection layer 11.

Figure 6:
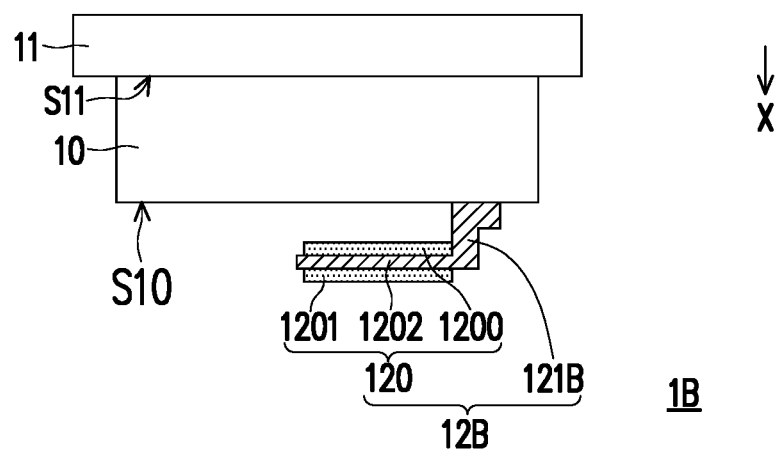

Please refer to FIG. 6. The main differences between an electronic device 1B and the electronic device 1 in FIG. 2 are described as follows. In the electronic device 1B, a sound broadcasting element 12B may contact the back surface S10 of the display panel 10. Further, the sound broadcasting element 12B may include the above-mentioned piezoelectric component 120 and a connection component 121B. The connection component 121B may contact the back surface S10 of the display panel 10. That is, the connection component 121B may be fixed by the back surface S10 of the display panel 10. For instance, the connection component 121B may be disposed on the backlight module of the electronic device 1B, which should however not be construed as a limitation in the disclosure.

By setting the sound broadcasting element 12B on the back surface S10 of the display panel 10, it is possible to achieve the narrow border design. In an embodiment, the electronic device 1B may not include the protection layer 11, which should however not be construed as a limitation in the disclosure.

Figure 7:
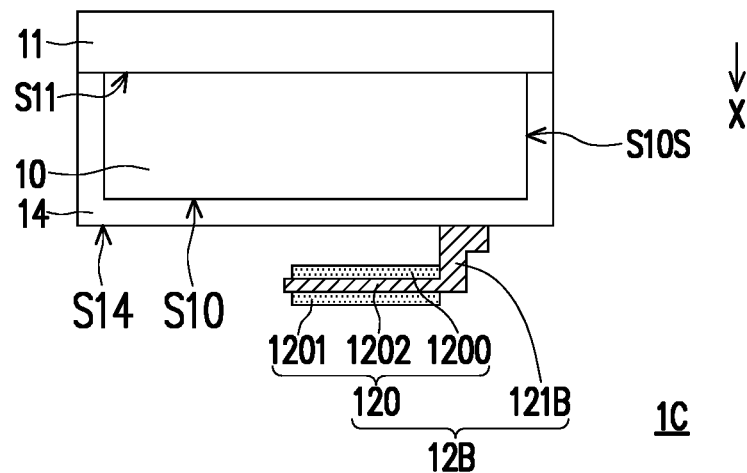

Please refer to FIG. 7. The main differences between an electronic device 1C and the electronic device 1B in FIG. 6 are described as follows. The electronic device 1C also includes a medium plate 14. The display panel 10 may be disposed in the accommodating space formed by the protection layer 11 and the medium plate 14, and the medium plate 14 may contact the inner surface S11 of the protection layer 11, the side surface S10S of the display panel 10, and/or the back surface S10 of the display panel 10. In addition, the sound broadcasting element 12B may contact an outer surface S14 of the medium plate 14. To be specific, the connection component 121B of the sound broadcasting element 12B may contact the outer surface S14 of the medium plate 14; in other words, the connection component 121B may be fixed by the outer surface S14 of the medium plate 14. In an embodiment, the electronic device 1C may not include the protection layer 11. In another embodiment, the electronic device 1C may further include the casing 15 as shown in FIG. 3.

Figure 8:
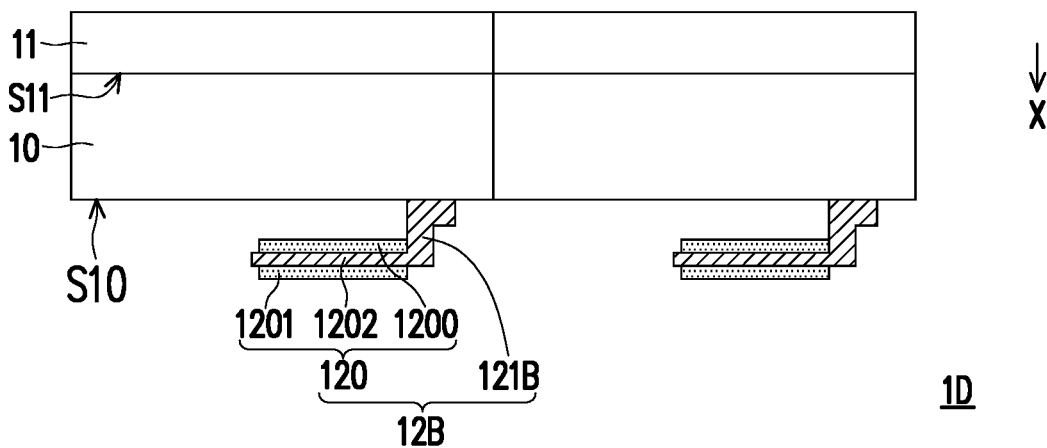

Please refer to FIG. 8. The main differences between an electronic device 1D and the electronic device 1B in FIG. 6 are described as follows. The electronic device 1D may be a tiled electronic device formed by tiling a plurality of (e.g., two) the electronic devices 1B depicted in FIG. 6. In an embodiment, the electronic device 1D may be a tiled electronic device formed by tiling a plurality of the electronic devices 1 depicted in FIG. 2, a plurality of the electronic devices 1A depicted in FIG. 5, a plurality of the electronic devices 1C depicted in FIG. 7, or a plurality of the electronic devices provided in the above embodiments. In an embodiment, the electronic device 1D may not include the protection layer 11.

Figure 9:
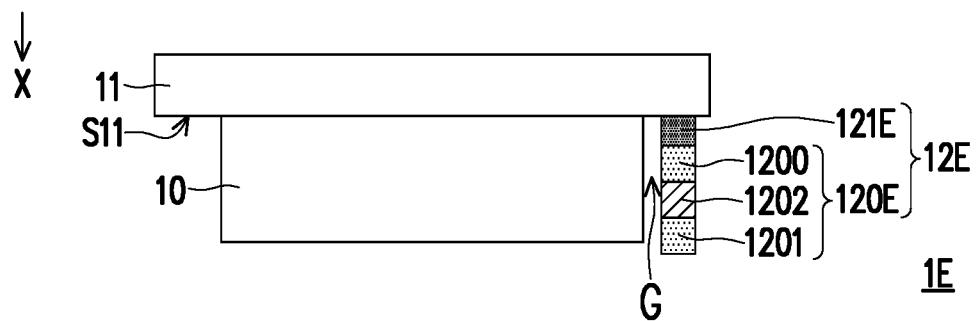

Please refer to FIG. 9. The main differences between an electronic device 1E and the electronic device 1 in FIG. 2 are described as follows. In the electronic device 1E, a piezoelectric component 120E and a connection component 121E in a sound broadcasting element 12E may be located on a side of the display panel 10, and there may be the air gap G between the side of the display panel 10 and the sound broadcasting element 12E as a whole (including the piezoelectric component 120E and the connection component 121E). In an embodiment, a material of the connection component 121E may include a conductive material or a buffer material. In an embodiment, the electronic device 1E may further include a casing (not shown), and there may be a relatively large cavity between the casing and the protection layer 11 (or between the casing and the display panel 10), and may be conducive to effective transmission of the vibration waves to the display panel 10 and the protection layer 11 when the piezoelectric portion vibrates at low frequencies (such as 250 Hz to 650 Hz).

Figure 10:
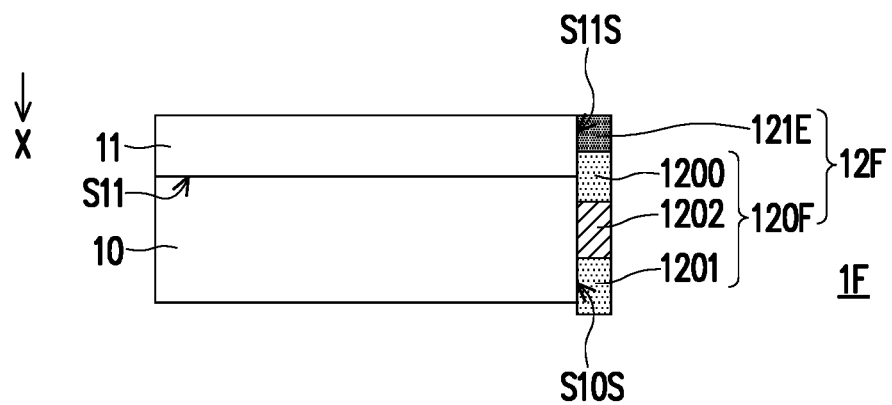

Please refer to FIG. 10. The main differences between an electronic device 1F and the electronic device 1E in FIG. 9 are described as follows. In the electronic device 1F, a sound broadcasting element 12F as a whole (including a piezoelectric component 120F and a connection component 121F) may contact the side surface S11S of the protection layer 11 and the side surface S10S of the display panel 10. In an embodiment, the electronic device 1F may not include the protection layer 11. In an embodiment, the electronic device 1F may further include a casing (not shown). In an embodiment, the sound broadcasting element 12F is disposed on the inner surface S11 of the protection layer 11 and contacts the side surface S10S of the display panel 10.

Figure 11:
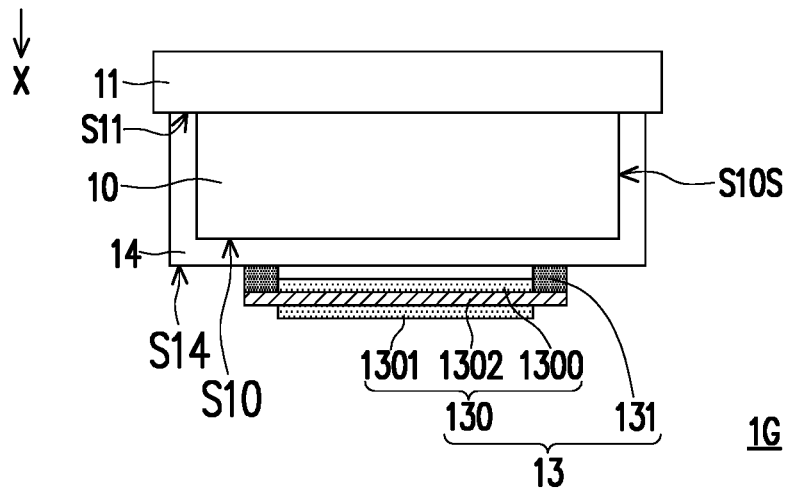

Please refer to FIG. 11. The main differences between an electronic device 1G and the electronic device 1 in FIG. 3 are described as follows. The electronic device 1G also includes the medium plate 14. The relative configuration relationship between the medium plate 14 and other elements may be referred to as those illustrated in FIG. 7 and will not be repeated hereinafter. The sound broadcasting element 13 may be in contact with the outer surface S14 of the medium plate 14. To be more specific, the connection component 131 of the sound broadcasting element 13 may contact the outer surface S14 of the medium plate 14. That is, the connection component 131 may be connected by the outer surface S14 of the medium plate 14. In an embodiment, the electronic device 1G may not include the protection layer 11. In an embodiment, the electronic device 1G may further include a casing (not shown).

Figure 12:
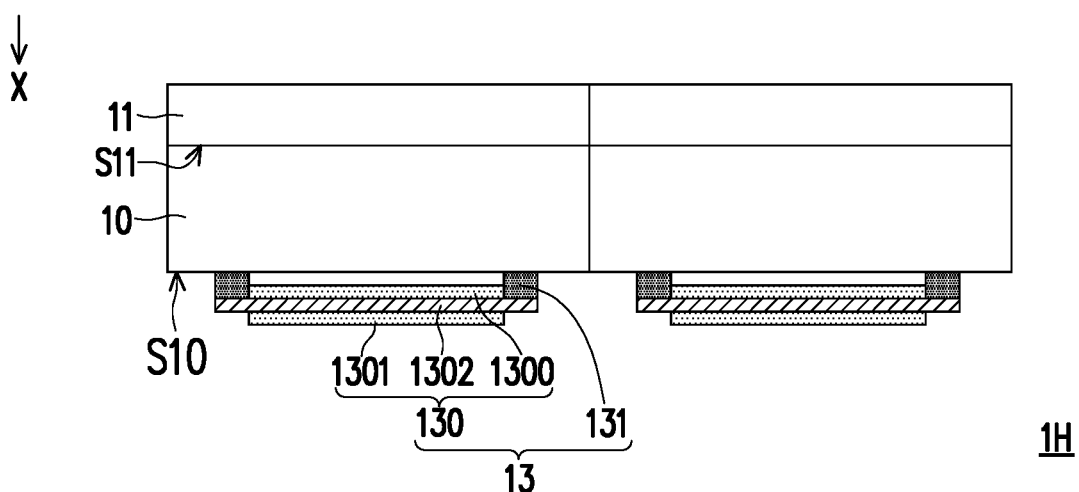

Please refer to FIG. 12. The main differences between an electronic device 1H and the electronic device 1 in FIG. 3 are described as follows. The electronic device 1H is a tiled electronic device formed by tiling a plurality of (e.g., two) the electronic devices 1 depicted in FIG. 3. In an embodiment, the electronic device 1H may be a tiled electronic device formed by tiling a plurality of the electronic devices 1E depicted in FIG. 9, a plurality of the electronic devices 1F depicted in FIG. 10, a plurality of the electronic devices 1G depicted in FIG. 11, or a plurality of the electronic devices provided in the above embodiments. In an embodiment, the electronic device 1H may not include the protection layer 11.

In the embodiments shown above and illustrated in FIG. 5 to FIG. 12, the sound broadcasting element may serve as an earpiece or a speaker, one or more sound broadcasting elements may be disposed in one single electronic device, and the number of the same sound broadcasting element in one single electronic device may be one or more.

To sum up, in one or more embodiments of the disclosure, with the setting of the sound broadcasting element, it is not necessary to design the sound hole in the display region of the electronic device, thereby increasing the screen-to-body ratio or achieving full-screen display. In an embodiment, the sound broadcasting element may also provide a tactile feedback function. In an embodiment, the configuration, the top-view shape, and the area of the piezoelectric portion in the sound broadcasting element can be designed, or the electronic device may further include the casing, so that the piezoelectric portion may effectively transmit the vibration waves to the protection layer while the piezoelectric portion vibrates at low frequencies. In an embodiment, the position of the sound broadcasting element may be designed to achieve the narrow border design.

The above embodiments merely serve to explain but not restrict the technical schemes provided in the disclosure. Although detailed descriptions are provided in detail with reference to the above embodiments, people having ordinary skill in the pertinent art should understand that the technical schemes described in the foregoing embodiments may be modified, or some or all of the technical features above may be equivalently replaced; these modifications or replacement may be provided without departing from the scope provided in one or more embodiments in the disclosure.

Although the embodiments and the advantages have been disclosed above, it should be understood that any person with ordinary skill in the pertinent art may make changes, substitutions, and refinements without departing from the spirit and scope of the disclosure. In addition, the scope of protection provided in the disclosure is not limited to the processes, machine, fabrications, compositions of substances, devices, methods, and steps provided in one or more embodiments described herein. People having ordinary skill in the pertinent art are able to understand the processes, machine, fabrications, compositions of substances, devices, methods, and steps provided in one or more embodiments developed at present or in the future, as long as the same function can be performed or the same result can be achieved according to the embodiments described in the disclosure. Accordingly, the scope of protection of the disclosure includes the above-mentioned processes, machine, fabrications, compositions of substances, devices, methods, and steps. In addition, each claim constitutes an individual embodiment, and the scope of the disclosure also includes the combination of the various claims and embodiments. The scope of protection of the disclosure is subject to what is defined in the appended claims. Any embodiment or claim of the disclosure is not required to achieve all the objectives, advantages, and features disclosed herein.

What is claimed is:

1. An electronic device comprising:
    a protection layer having an inner surface and a side surface directly connected to the inner surface;
    a display panel disposed on the inner surface of the protection layer and having a back surface and a side surface directly connected to the back surface; and
    a sound broadcasting element located adjacent to the side surface of the display panel, and comprises a piezoelectric component and a connection component,
    wherein the sound broadcasting element contacts the side surface of the protection layer and the side surface of the display panel.

2. The electronic device as claimed in claim 1, wherein the connection component contacts the side surface of the protection layer.

3. The electronic device as claimed in claim 2, wherein a length of the connection component along a normal direction of the inner surface of the protection layer is less than a thickness of the protection layer.

* * * * *